Patented Feb. 27, 1934

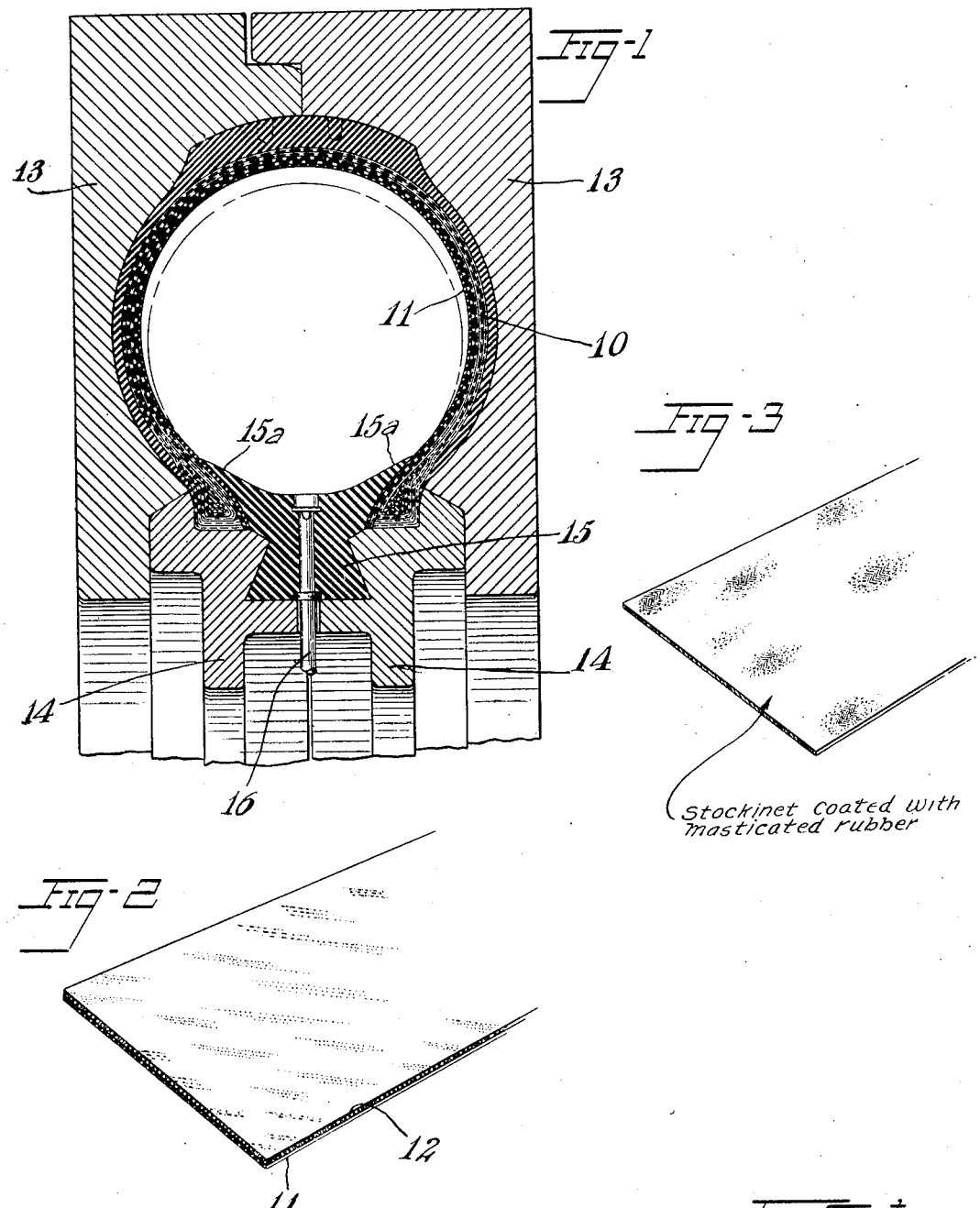

1,949,057

UNITED STATES PATENT OFFICE 1,949,057

RUBBER ARTICLE AND METHOD OF MAKING THE SAME

Charles W. Leguillon, Akron, Ohio, assignor to The B. F. Goodrich Company, New York, N. Y., a corporation of New York Application May 31, 1930. Serial No. 458,014

10 Claims. (Cl. 18—59)

This invention relates to rubber articles such as pneumatic tires and to methods of making the same.

The use of expansible cores in the manufacture of pneumatic tires is expensive procedure, involving as it does the mounting of the cores in the tires, the subsequent removal therefrom, and the evacuation of the cores. Moreover the cores are subject to depreciation and have relatively short life. Attempts to dispense with expansible cores and to vulcanize tires with hot water under pressure against the interior of the tires heretofore have resulted in failure either because the water penetrated the inner ply of the tire and produced a balanced pressure on opposite sides thereof such as to prevent its stretching, or because the softening of the rubber surrounding the cords of the inner ply of the tire, during the initial stage of vulcanization, has permitted said rubber to be pressed between the cords and produced a balanced pressure condition on opposite sides of the cords, with the result that they contract to their original unstretched positions. The same undesirable results obtain when steam or air is used as the pressure and vulcanizing medium, and air has the further disadvantage that it oxidizes the rubber with which it comes into contact.

The chief object of the invention is to effect economy in the manufacture of tire casings and reduce the cost thereof. More specifically I aim to eliminate the use of expansible cores in the manufacture of pneumatic tires; to provide a tire of such construction as to render practical the vulcanization thereof without the use of a water bag or other expansible core; and to shorten the time required for the vulcanization of pneumatic tires.

Of the accompanying drawing:

Fig. 1 is a transverse section of a tire mold, and my improved tire, in its preferred form, mounted therein in the position it occupies at the conclusion of the vulcanizing operation.

Fig. 2 is a perspective view of rubberized fabric used as the innermost ply of the tire in one embodiment of my invention.

Fig. 3 is a perspective view of rubberized stockinet used as the innermost ply of the tire in a modified embodiment of my invention.

Briefly stated, the invention in its preferred form consists in providing a tire with an inner facing or layer of vulcanizable material which in its unvulcanized state is tough, dense, and resilient, and which does not become excessively soft or flowable even at vulcanizing temperatures.

Such a tire is shown in Fig. 1 of the drawing, wherein 10 is a tire casing which in general is of standard construction, comprising plies of cord fabric and masticated rubber, and 11 is the inner facing or layer of vulcanizable material of the characteristics aforesaid.

The tire is vulcanized in the cavity between the usual separable mold sections 13, 13, the bead portions of the tire being engaged by respective clamping rings 14, 14. A bull-ring 15 of rubber is mounted between the bead portions of the tire and held securely in position by engagement with the bead-clamping rings 14, the bull-ring being formed with flexible lateral wings or lips $15^a$, $15^a$ adapted to lie against the inner wall of the tire and to be urged into sealing engagement therewith, in the manner of lip gaskets, by the pressure of hot, vulcanizing fluid which is admitted to the interior of the tire during the vulcanization thereof. A valve stem 16 is mounted in the bull-ring 15 for conducting fluid therethrough to the interior of the tire.

The tire 10 initially is made somewhat smaller than the mold cavity, substantially as indicated by the arcuate broken line (Fig. 1) adjacent its inner wall, and is distended to the full line position of the drawing by the pressure of the heated fluid admitted to the interior of the tire through the valve stem 16, with the result that the cords of the respective fabric plies of the tire are stretched a determinate degree. Because the facing 11 on the inner wall of the tire does not appreciably soften or flow at vulcanizing temperature, although built into the tire in an unvulcanized condition, so as to unite firmly with the rest of the structure, it provides an impervious, tough, extensible wall between the tire fabric and the vulcanizing fluid, with the result that the respective cord strands of the tire are held securely in their stretched condition against contraction.

The facing or layer 11 may consist of stockinet coated with rubber, but it preferably consists of unmasticated rubber. In the case of stockinet the close association of the fabric strands effectively prevents any appreciable flow of the rubber even after the latter has been softened by the heat of the vulcanizing fluid, with the result that the layer remains impervious and the fabric strands of the tire carcass are duly stretched and so held during the vulcanization of the tire.

Because it involves less departure from standard practice, I prefer to form the facing 11 of unmasticated rubber, preferably deposited in sheet form from latex, which lends itself readily to manufacturing processes. The latex rubber may be applied to the inner wall of the tire after the tire is fabricated as by spraying it thereon, or it may be applied to tire building fabric by any of the usual methods, such as spreading, spraying, dipping, or electro-deposition. In the latter method the layer 11 preferably is applied as a coating to one side of a sheet of weftless or weak-wefted fabric 12 after the latter has received thin friction-coats of ordinary masticated rubber on both sides. The fabric sheet subsequently is bias-cut into strips of suitable width for tire building, such a strip being shown in Fig. 2, and incorporated in tires as the inner plies thereof with the coating of unmasticated rubber exposed on the inner surface of the tires.

The facing 11 of unmasticated rubber does not appreciably soften at vulcanizing temperature, but becomes tenaciously adhered to the underlying masticated rubber, and it oxidizes only slightly in the presence of the usual vulcanizing fluids. The finished tire presents a smooth inner surface upon which an inner tube slides with but little friction.

In addition to obviating the use of expansible cores, the invention effects considerable saving in the time required for vulcanizing tires, since the latter are interiorly heated directly by contact with the vulcanizing fluid and not by conduction of heat through the thick wall of a core.

Modifications are possible within the scope of the appended claims, as I do not limit my claims wholly to the specific construction shown or exact procedure described.

I claim:

1. The method of making a vulcanized rubber article which comprises fabricating the major portion of the article of material including masticated rubber at the surface of the structure, applying to the structure a surfacing layer of material comprising unvulcanized rubber relatively non-flowing at vulcanizing temperature, and vulcanizing the article while holding it distended by pressure fluid applied directly to said surfacing layer.

2. A method as defined in claim 1 in which the surfacing layer comprises unmasticated rubber.

3. A method as defined in claim 1 in which the surfacing layer comprises a rubberized fabric of such fine mesh as to cause the rubber thereof to be substantially non-flowing at vulcanizing temperature.

4. The method of making a pneumatic tire which comprises fabricating the carcass of the tire of rubberized cord fabric and an inner surface layer comprising unvulcanized rubber relatively non-flowing at vulcanizing temperature, closing the inter-bead space of the tire and vulcanizing the tire while holding it distended by pressure fluid applied directly to said surface layer.

5. A method as defined in claim 4 in which the inner surface layer comprises unmasticated rubber.

6. A method as defined in claim 4 in which the inner surface layer comprises close-mesh, knitted, rubberized fabric.

7. The method of making pneumatic tires which comprises fabricating a tire, forming in place on the inner surface thereof a layer of unmasticated rubber, and vulcanizing the tire while it is distended by fluid in contact with said layer.

8. The method of making pneumatic tires which comprises fabricating a tire, then applying to the inner surface thereof a layer of unmasticated rubber, and then vulcanizing the tire while it is distended by fluid in contact with said layer.

9. An integral rubber article adapted to resist permeation by fluid under pressure and constituting a fluid-retaining wall of a fluid container, said article comprising a sealing layer of unmasticated rubber and a backing layer therefor on the side thereof away from the fluid and comprising masticated rubber.

10. An integral rubber article adapted to resist permeation by fluid under pressure and constituting a fluid-retaining wall of a fluid container, said article comprising a sealing layer of rubber relatively impermeable to gas, and a backing therefor on the side thereof away from the fluid and comprising masticated rubber, both layers being in substantially the same condition as to vulcanization.

CHARLES W. LEGUILLON.